United States Patent
Silva et al.

(10) Patent No.: US 6,769,665 B2
(45) Date of Patent: Aug. 3, 2004

(54) ELECTRIC VALVE ACTUATOR WITH FAILSAFE APPARATUS

(75) Inventors: Gabriel Silva, Baldwinsville, NY (US); Earl Holdren, Hannibal, NY (US)

(73) Assignee: Young & Franklin Inc., Liverpool, NY (US)

( * ) Notice: Subject to any disclaimer, the term of this patent is extended or adjusted under 35 U.S.C. 154(b) by 40 days.

(21) Appl. No.: 10/319,344

(22) Filed: Dec. 13, 2002

(65) Prior Publication Data

US 2004/0113110 A1 Jun. 17, 2004

(51) Int. Cl.[7] .............................................. F16K 31/04
(52) U.S. Cl. ...................................... 251/71; 251/255
(58) Field of Search .............................. 251/68, 69, 70, 251/71, 129.11, 129.12, 129.13, 77, 252, 253, 254, 255

(56) References Cited

U.S. PATENT DOCUMENTS

| | | | | |
|---|---|---|---|---|
| 4,651,969 A | * | 3/1987 | Dowdall ...................... 251/252 |
| 4,730,511 A | * | 3/1988 | Tsujimura .................... 74/567 |
| 4,809,748 A | * | 3/1989 | Robins ................. 251/129.13 |
| 5,108,073 A | * | 4/1992 | Adachi ........................ 251/252 |
| 5,226,451 A | * | 7/1993 | Brumfield ............... 251/129.11 |
| 5,269,492 A | * | 12/1993 | McLennan ................... 251/252 |
| 5,568,911 A | * | 10/1996 | Kim ....................... 251/129.12 |
| 5,697,397 A | * | 12/1997 | Mellem et al. ................ 251/68 |
| 6,007,047 A | * | 12/1999 | Phipps ........................ 251/252 |

* cited by examiner

Primary Examiner—Eric S. Keasel
(74) Attorney, Agent, or Firm—Wall Marjama & Bilinski LLP

(57) ABSTRACT

An electric valve actuator with a failsafe device for a rotary type valve that is coupled to a drive shaft screw by means of a clutch. A cam cylinder is secured to the drive shaft screw and is also connected to the stem of the valve. A cam follower is slidably mounted upon the drive shaft and traces a cam profile form in the cylinder as the cylinder turns. A series of torsion springs are connected to the cylinder so that the springs are wound into a loaded condition as the cam cylinder moves from a valve closed position to a cam opening position. In the event of a power failure while the valve is opened, the clutch disengages the motor from the drive shaft and the springs unwind quickly to move the cam cylinder toward the valve closing position. At this time the motion of the cylinder is controlled by the cam follower which regulates the valve closing sequence.

13 Claims, 2 Drawing Sheets

ELECTRIC VALVE ACTUATOR WITH FAILSAFE APPARATUS

FIELD OF THE INVENTION

This invention relates to an electric valve actuator having a failsafe system for use in a rotary valve.

BACKGROUND OF THE INVENTION

Many rotating valves are operated by actuators that rotates the valve 0–90° to open and 90–0° to close. The actuators can be electrically operated (motor, pinion, gear), hydraulically, pneumatically, or pilot operated. When fast acting is required the electric motor with mechanism is usually slow to open or close as compared to hydraulic, pneumatic, or pilot operated valves.

Hydraulically operated valves require hydraulic power and control valves, linear actuators and linkages, or rotary actuators to rotate the valve 0–90°. This tends to make the valve package large since a hydraulic power source is required.

Pneumatic valve operation (using air) requires a compressor line, regulators, control valves, and linear or rotary actuators with the response limited to the compressor, flow and pressure, and exhaust lines.

Pilot operated valves use a solenoid pilot valve that directs the gas pressure of the gas line to an actuator that rotates the valve. A minimum pressure is required to operate the valve and an external venting line needs to be added to release gas flow used by the pilot valve.

A spring return is usually required for a failsafe operation in all of the above mentioned designs. The implementation of the spring is packaged in the hydraulic, pneumatic, and pilot operated systems. In a mechanical system with electric motor, the spring packaging tends to be complicated and usually another external power source is required.

This invention presents an alternative to the above mentioned designs by providing an actuation method that allows operation of a rotary valve through a direct coupling mode with a failsafe spring for fast actuation and safe operation. This invention avoids the use of external gas leakage lines, external power sources, or hydraulic power by providing a motorized valve with a fast failsafe mechanism in the event of power failure.

SUMMARY OF THE INVENTION

It is therefore an object of the present invention to improve the electric type actuation of rotary type flow control valves.

It is a further object of the present invention to improve the safety of rotary type flow control valves.

Another object of the present invention is to more rapidly close a motor driven rotary type flow control valve in the event of a power failure.

A still further object of the present invention is to improve failsafe devices for closing a rotary type valve in the event an emergency situation is sensed.

These and other objects of the present invention are attained by means of a failsafe device for use in a rotary type control valve that includes an electrical drive motor having an output shaft that is coupled to a drive shaft through an electric clutch. The drive shaft is arranged to turn a cam cylinder which, in turn, rotates the stem of the control valve. A cam profile is provided in the cam cylinder and a cam follower that is slidably mounted on the drive shaft traces the profile of the cam as the valve moves between a fully closed and a fully open position. A series of torsion springs are connected to the cam cylinder so that the springs are wound to a loaded or energy storing condition as the valve is turned from a closed position to an open position. In the event of a power failure the clutch disconnects the motor from the drive shaft and the springs are allowed to unwind and thus turn the cam cylinder so as to close the valve. During this time, the cam follower controls the motion of the cylinder during the closing sequence.

BRIEF DESCRIPTION OF THE DRAWINGS

For a further understanding of these and objects of the present invention, reference will be made to the following detailed description of the invention which is to be read in association with the accompanying drawing, wherein.

DETAILED DESCRIPTION OF THE INVENTION

Figure 1:
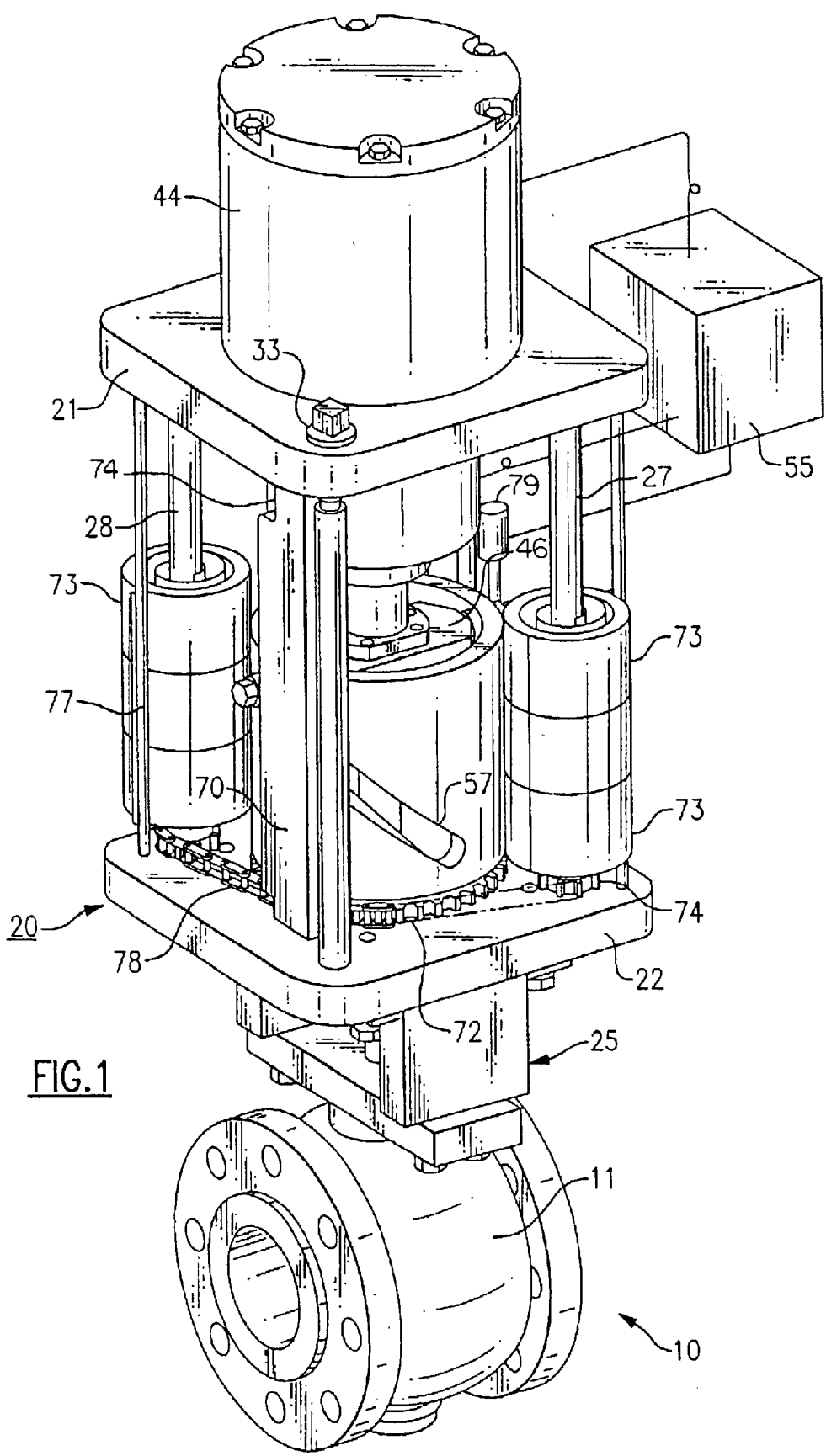
FIG. 1 is a perspective view showing a valve having a failsafe device embodying the teachings of the invention mounted thereon.
Figure 2:
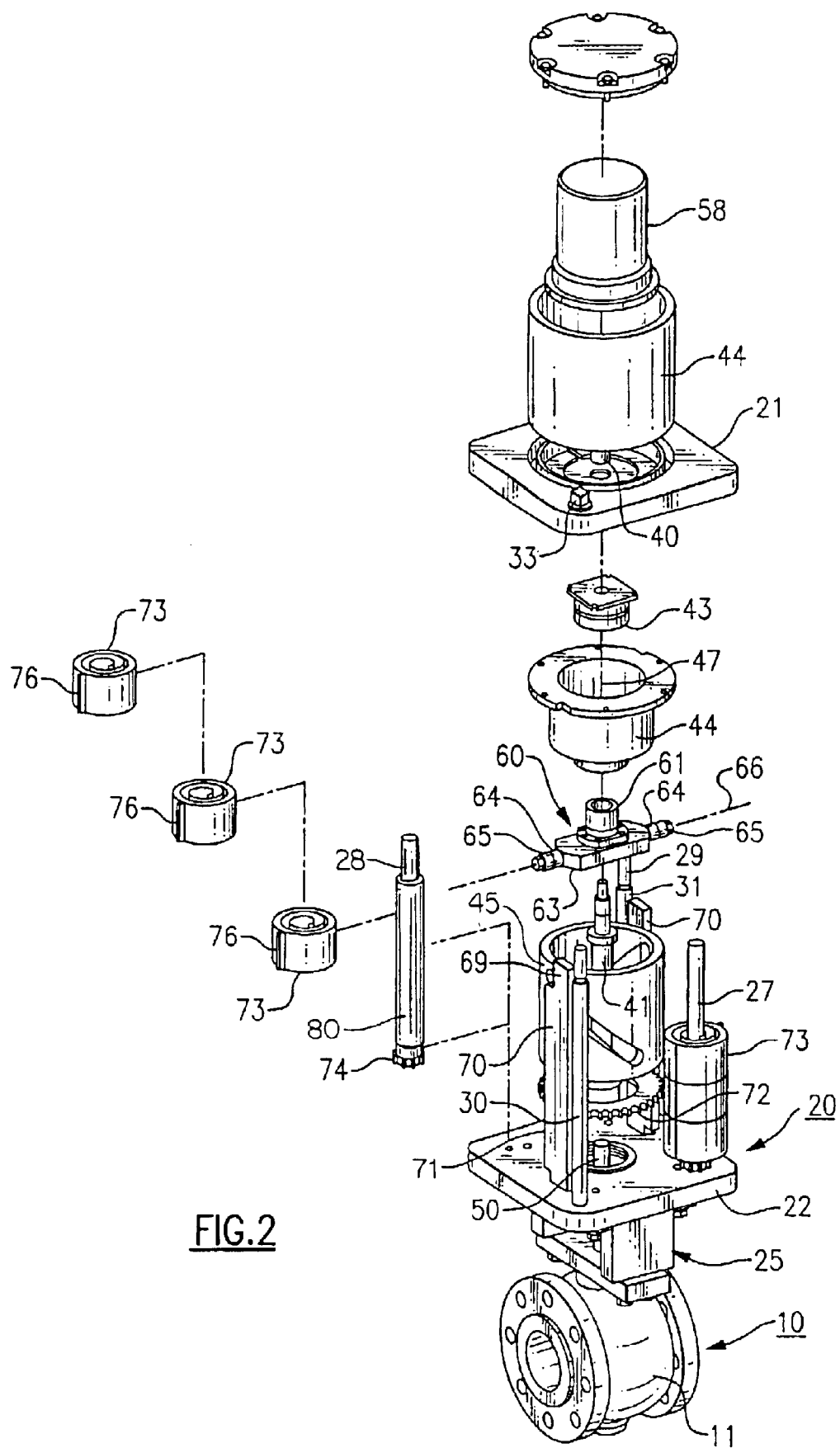
FIG. 2 is an exploded view in perspective showing the component of the failsafe apparatus.

Turning now to the drawings there is illustrated a conventional electrically activated control valve generally referenced 10. The valve is contained within valve casing 11 and is used to control the flow of a fluid through a supply line (not shown). The valve is a rotary stem type wherein the valve is turned from a fully closed position to a fully open position by rotating the valve 90° or a quarter of a turn.

A frame generally reference 20 is mounted upon the valve casing. The frame contains a pair of rectangular spaced apart plates that include an upper plate 21 and a lower plate 22. The lower plate is supported upon a mounting bracket 25 that is affixed to the casing as by welding. Four spacer columns are mounted at the corners of the plates. Two of the columns 27 and 28 have end sections that are press fitted into the plates using an interference fit such that the columns cannot turn when a high torque is applied thereto. The remaining two columns 30 and 31 each have threaded end sections 29 that pass through the end plates and are secured in place by nuts 33.

A bi-directional electric motor 58 is mounted in a housing 44 located in the upper plate 21 and the output shaft 40 of the motor is coupled to a drive screw 41 by means of an electrically activated clutch 43 that is contained in clutch housing 44. The drive shaft passes into a cam cylinder 45 and is coupled to inner surface of the cylinder by a spider 46 so that the cam cylinder turns about the axis of 47 of the motor.

The drive shaft 41 can be either an ACME screw or a ball screw. The nut or ball screw carriage 41 is connected to the cam follower 64.

The cam cylinder is also connected to the stem 50 of the valve by a second spider so that the valve can be rotated between the closed and open positions as the cam cylinder turns through 90° of arc. In practice, the motor that is employed is a stepper or a brushless DC or AC motor that is regulated by a controller 55 which is programmed move the cam cylinder between a valve opening and a valve closing position in response to appropriate input signals to the controller. A limit switch 79 to indicate the end of cam rotation and spring loaded condition is used to provide the controller 55 with a signal to stop motor rotation 58. It is activated when it gets in contact with the roller 65.

The ball screw 41 pitch combined with the cam cylinder profile 45 provides the necessary torque ratio amplification so the motor can open the valve against pressure and the loaded springs.

The cam cylinder has a pair of opposed cam profiles 57 formed in its circular side wall. The cam profile are cut so that they pass through the side of the cylinder with one profile being a mirror image of the other and being 180° out of phase therewith. A cam follower unit 60 is mounted upon the drive shaft 40 by means of a ball screw mechanism 61 so that the follower can move freely along the drive shaft. The cam follower unit includes a radially extended arm 63 that has a cam follower 64 and a roller 65 mounted upon each end of the arm. Each cam follower and its companion roller are cylindrical elements having the same diameter. The elements are coaxially aligned along the center line 66 of the arm. In assembly, the cam followers ride in the opposed cam profiles of the cam cylinder and the rollers extend outwardly beyond the outer wall of the cam cylinder. When the cam cylinder has placed the valve in a fully closed position the two cam followers will be situated at the top or upper ends of the cam profiles. When the cam cylinder has moved the valve to a fully open position the cam followers will be located at the bottom of the cam profiles.

A pair of vertical disposed stop members 70—70 are mounted between the two plates 21 and 22 of the frame 20. The two ends of each stop has a necked down section 69 that is stacked in a suitable receiving hole formed in an adjacent plate. The stop members are circumferentially spaced apart so that the rollers of the cam follow unit are retained against vertical surfaces of each vertical member and guided so that the follower unit can only move up and down vertically as the cam cylinder rotates about the axis of the drive shaft.

A drive sprocket 72 is mounted upon the cam cylinder beneath the bottom surface of the cylinder so that the sprocket turns with the cylinder. A series of torsion springs 73—73 are mounted in stacks upon bushing 80 that mounts on the two frame columns 27 and 28. A driven sprocket 74 is connected to bushing 80 rotatably supported upon each of the two columns. The inner end of each spring is attached to a driven sprocket bushing 80 while the outer ends 76 of the springs are attached by a column retainer 77. A chain 78 connect the two driven sprockets to the drive sprocket so that the springs in each stack are wound into a loaded or energy absorbing condition when the cam cylinder moves the valve toward the open position.

In the event of a power failure or the sensing of a similar dangerous condition, the controller will immediately de-engage the clutch thereby separating the drive shaft from the holding action of the motor. At this time the sprocket system under the influence of the loaded torsion springs causes the cam cylinder to move from an opening position toward a fully closed position. The motion of the cam cylinder is now under the control of the cam follower unit which is programmed brings the cylinder to a stop once the valve is fully closed.

Although, two torsion spring stacks, each containing three springs, each are employed in the presently described embodiment of the invention, it should be evident that more or less springs in different arrangements may be employed in the practice of the present invention. By the same token the chain and sprocket drive may be replaced with a gear drive or any other drive system for gaining the desired results without departing from the teachings of the present invention.

While the present invention has been particularly shown and described with reference to the preferred mode as illustrated in the drawing, it will be understood by one skilled in the art that various changes in detail may be effected therein without departing from the spirit and scope of the invention as defined by the claims.

We claim:

1. An electric valve actuator with a failsafe system for use in a control valve that includes:

a bi-directional drive motor having an output that is coupled to a drive shaft by an electrically actuated clutch;

said drive screw being connected to a cam cylinder, said cam cylinder being arranged to turn about the axis of said drive shaft;

said cam cylinder being further connected to a stem of a valve for moving said valve between a valve closing position and a valve opening position as the cam cylinder turns in a first direction and between a valve opening position and a valve closing position as the cam cylinder turns in a second direction;

means for coupling said cam cylinder to a spring means so that said spring means stores energy as the cam cylinder turns in said first direction and releases said energy as the cam cylinder turns in said second direction;

a cam follower unit connected to the drive screw and being arranged to ride in a cam profile formed in the cam cylinder as said cam cylinder moves between said valve opening position and said valve closing position; and control means for de-energizing said clutch to release the motor from the drive shaft wherein said spring means releases energy to move the cam cylinder in said second direction toward a valve closing position and wherein said cam follower guides the cam cylinder into said valve closing position.

2. The actuator of claim 1 the drive screw has a pitch ratio for amplifying motor input torque wherein and increased output torque is applied to the cylinder by the cam follower.

3. The actuator of claim 2 wherein the cam profile act in conjunction with the drive screw to further increase the output torque of the cam follower.

4. The actuator of claim 1 wherein said cam cylinder has a pair of opposed cam profiles, one being a mirror image of the other and said cam follower unit includes an arm that is slidably mounted upon said drive shaft and having followers mounted upon each end of said arm so that each of said followers ride in one of said cam profiles.

5. The actuator of claim 1 that further includes stop means for preventing the followers from turning with said cam cylinder as said cylinder rotates about the axis of said drive shaft.

6. The actuator of claim 5 wherein said stop means further includes a pair of opposed vertically disposed posts spaced on opposite sides of the cam cylinder and a pair of rollers, each being connected to one end of said arm and arranged to ride against one of said posts so that the cam follower unit moves in a vertical plane as the cam cylinder turns.

7. The actuator of claim 1 wherein said clutch is electrically energized and de-energized by said control means.

8. The actuator of claim 1 wherein said spring means includes at least one torsion spring.

9. The actuator of claim 8 wherein said at least one torsion spring is connected to said cam cylinder by a chain and sprocket drive.

10. The actuator of claim 9 that further includes a support frame that contains an upper plate and a lower plate that are spaced apart by a number of posts, and wherein a series of torsion springs are stacked upon one of said posts.

11. The actuator of claim 10 wherein the torsion springs are stacked upon a plurality of posts.

12. The actuator of claim 10 wherein said motor is mounted in said upper plate of the frame.

13. The actuator of claim 10 wherein the stacked springs and the ratio of the sprocket increase the failsafe output torque of the system.

* * * * *